Dec. 14, 1937.     T. ZUSCHLAG     2,102,451
MAGNETIC ANALYSIS
Filed April 23, 1936     2 Sheets-Sheet 1

Fig. 1.

INVENTOR
Theodor Zuschlag
BY
Pennie, Davis, Marvin and Edmonds
ATTORNEYS

Dec. 14, 1937.          T. ZUSCHLAG          2,102,451
MAGNETIC ANALYSIS
Filed April 23, 1936          2 Sheets-Sheet 2

Fig.2.

INVENTOR
*Theodor Zuschlag*
BY
*Pennie, Davis, Marvin and Edmonds*
ATTORNEYS

Patented Dec. 14, 1937

2,102,451

UNITED STATES PATENT OFFICE 2,102,451

MAGNETIC ANALYSIS

Theodor Zuschlag, West Englewood, N. J., assignor to Magnetic Analysis Corporation, a corporation of New York Application April 23, 1936, Serial No. 75,943

7 Claims. (Cl. 175—183)

This invention is concerned with the determination of the physical and metallurgical characteristics of magnetizable bodies by magnetic means, and aims to provide apparatus for conducting a comprehensive analysis of magnetizable bodies of substantially uniform cross-section, for example, hot and cold-rolled steel bars, tubes and steel cables.

Magnetic analysis of steel and other magnetizable bodies is becoming increasingly important. At the present time a large part of the cold-rolled steel produced in the United States is subjected to one form or another of magnetic analysis in order to determine the presence of flaws, deviations in hardness and other metallurgical characteristics. By this means unsatisfactory material is detected and rejected, so that it cannot cause difficulties in subsequent fabricating operations. Thus, cold-rolled hexagonal bars destined for spark plug manufacture are tested magnetically before being sent to the spark plug fabricator, and in this way the waste in fabrication has been reduced substantially. It is present practice to test each bar individually, instead of relying upon supposedly representative samples in each lot, thus insuring the satisfactory character of the entire output, but at the same time increasing the load upon the testing apparatus. To meet this increasing load, steel samples are passed through the magnetic analysis apparatus at high speeds—in some cases up to two hundred feet per minute. Inasmuch as the test coil is usually about a foot long, a given point on a bar remains within it for less than a third of a second. In this time it is necessary to determine whether or not flaws are present at the point in question, and whether the bar conforms to standard requirements for chemical analysis, heat treatment, etc. Apparatus that will meet such exacting demands must be exceedingly sensitive and also rugged, inasmuch as it is often in service twenty-four hours a day for an entire week. Moreover, the apparatus should be relatively simple to operate, and should indicate the presence of flaws, etc., clearly and for a sufficient time as to ensure detection by an operator of average skill and alertness.

Oscillographic types of instruments, while sensitive, are not rugged. Moreover, the indications produced are difficult to observe and to interpret when material is passed through magnetic analysis apparatus at high speed. Consequently, their use in high speed testing has proved unsatisfactory, and even when used in slow speed testing they impose undue strain on the eyes of the operator. Other heretofore customary types of magnetic analysis apparatus have also proved inadequate for the varied and exacting requirements of the steel industry. No one of the heretofore customary types of apparatus has proved satisfactory for all types of service.

As a result of my investigations I have discovered a method of and apparatus for magnetic analysis which fulfill modern requirements. Requirements for sensitivity, ruggedness, reliability and ease of operation have been met to a degree not approached heretofore, and a more comprehensive analysis is made in shorter time. Moreover, the difficulties ascribable to "end effect" have been eliminated. By "end effect" I mean the strain placed upon the apparatus when a magnetizable body is passed into or removed from the apparatus, thus suddenly changing the electromagnetic flux in the coil assembly.

*The apparatus in general*

In the preferred form of my invention I employ a test coil assembly having a primary test coil adapted to be energized by an alternating current, and one or more of the following:

(1) A secondary coil, which with appurtenant apparatus, enables me to determine whether a specimen conforms to a predetermined electrical standard. This portion of the apparatus is hereinafter referred to as the "artificial standard circuit".

(2) A plurality of secondary coils together with appurtenant apparatus whereby the presence of physical flaws, blow holes, etc. in a specimen are detected, even when the specimen is passed through the test coil assembly at high speed. This portion of the apparatus is conveniently designated as the "flaw detector circuit".

(3) A plurality of short-circuit rings for reducing end effect; and (4) A plurality of secondary coils and appurtenant apparatus, which prevent the straining of delicate indicating instruments and the like by any residual end effect. This portion of the apparatus is hereinafter referred to as the "indicator control circuit".

Each of the above enumerated features of the test coil assembly may be eliminated, if desired, but I have found that greatly improved results are obtained when all four cooperate in high speed testing.

A thorough understanding of my invention will be gained from the following description taken in conjunction with the accompanying drawings, in which.

The test coil assembly

Figure 1:
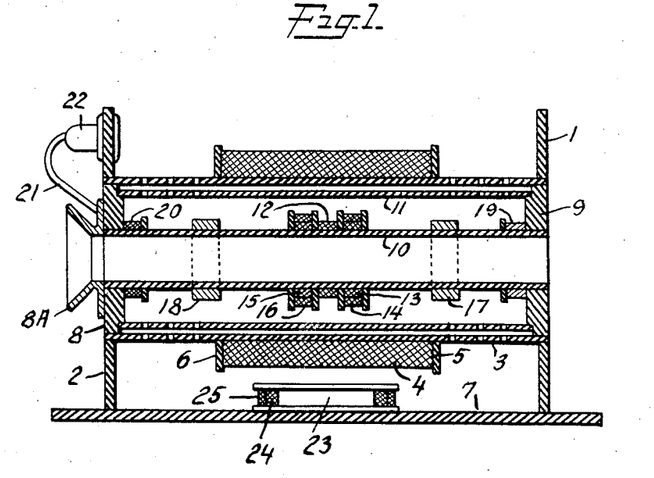
Fig. 1 is a sectional representation of a presently preferred form of test coil assembly of my invention.

The test coil assembly shown in Fig. 1 comprises a pair of non-conducting end plates 1 and 2 into which is rigidly fitted a perforated barrel 3 of "Bakelite" or other non-conducting material, around the middle of which is wound a primary or exciter coil 4 which is held in place by a pair of end rings 5 and 6. The end plates are fastened onto a horizontal base plate 7 preferably made of non-conducting material.

Within the barrel, so that it may be removed if necessary, is a secondary coil assembly which comprises a pair of annular non-conducting ends 8 and 9 whose outside diameter is such that they fit loosely into the barrel. The annular ends are fastened together on their insides by a second non-conducting barrel 10 and at their outside by a third non-conducting barrel 11 which is also perforated. The perforations in barrels 3 and 11 permit ventilation and heat dissipation within the secondary coil assembly.

A funnel-shaped metal guide 8A is fastened to the outside of one of the annular ends of the secondary coil assembly to facilitate the entrance of specimens into the barrel 10, and to protect the end of the test coil assembly.

The various secondary coils are wound around the inside barrel 10 of the secondary coil assembly as follows:

At the center of the innermost barrel is a "specimen" secondary coil 12. On either side of the "specimen" secondary, and well within the primary test coil, are two pairs of "flaw" coils, numbered, respectively, 13, 14 and 15, 16. The four flaw coils are substantially identical and of low ohmic resistance. Each pair of "flaw" coils is so wound that one of the pair is nearer to the inside barrel 10 than the other of the pair, for reasons which will be set forth hereinafter. Approximately in line with the two ends of the primary test coil and fastened rigidly to the barrel 10 are a pair of heavy metal short circuit or "end effect" rings 17 and 18, preferably made of brass, copper, or aluminum and at least ½ inch thick. At the ends of the barrel 10 and abutting against the annular ends of the secondary coil assembly are disposed respectively two "end effect" or "relay" coils 19 and 20.

Figure 2:
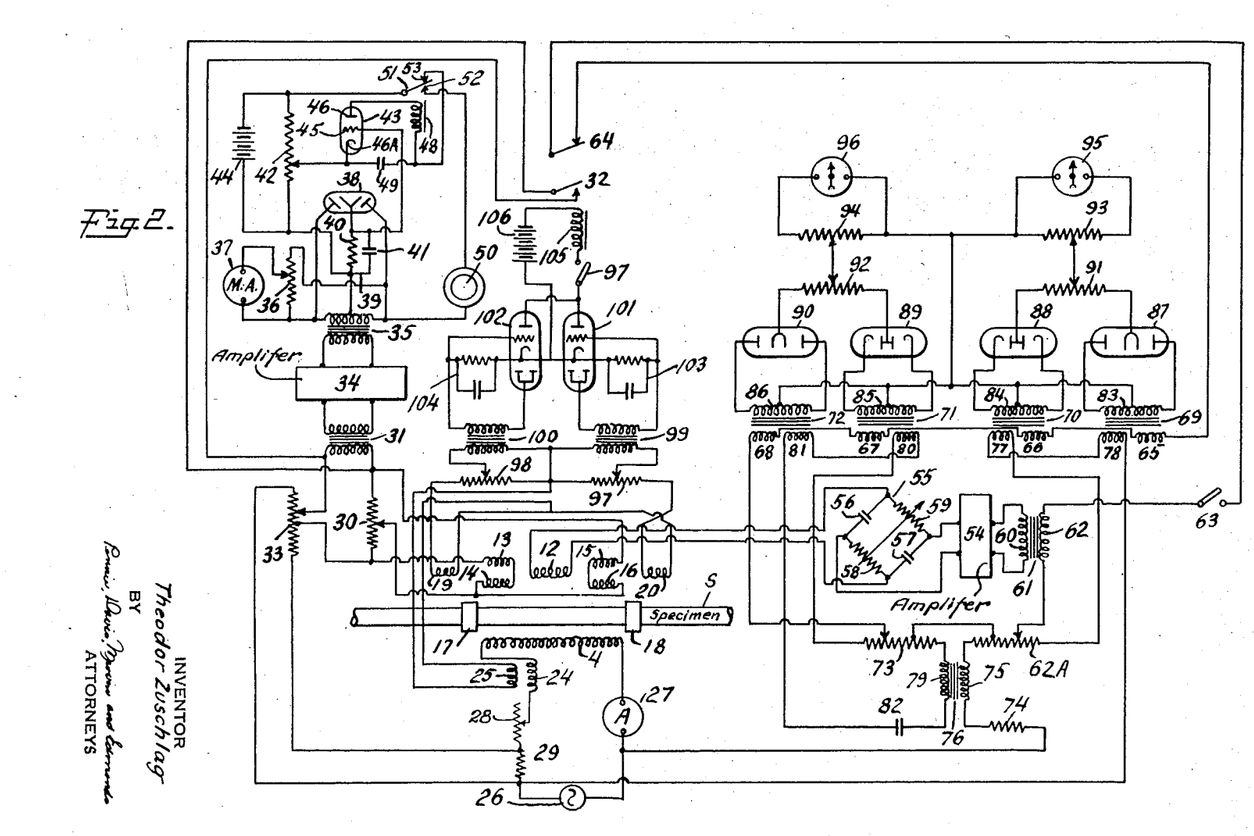
Fig. 2 is a wiring diagram of the complete apparatus of my invention in a presently preferred form.

The end connections of the secondary coils on the barrel 10 are carried through a loom 21 passing through one end of the secondary coil assembly and fastened to a multi-prong plug 22 through which the connections are completed to other portions of the apparatus as shown in the wiring diagram (Fig. 2).

Resting on the base plate is a spool 23 made of non-conducting material, which is horizontally disposed. A primary "auxiliary" coil 24 is wound on the spool and a secondary "auxiliary" coil 25 is wound around it so that both of these coils are disposed at right angles to the primary test coil.

All of the coils in the test coil assembly are wound with insulated wire of low ohmic resistance.

The barrels, spools, end plates, etc. of the test coil assembly are made of "Bakelite", or similar non-conducting material.

As hereinbefore indicated the secondary coil assembly may be removed from the barrel upon which the primary coil is wound, and replaced by another having a barrel 11 of different diameter. In this way the test coil assembly may be changed to accommodate various sizes of magnetizable material. The overall size of the test coil assembly, will depend, of course, upon the size of the material to be tested. Ordinarily, the test coil assembly will be about two feet long, and the primary coil will have a superficial length of one foot or less.

The various connections and functions of the individual coils in the test coil assembly which has just been described may be seen in Fig. 2, to which reference should now be made.

The primary test coil 4 is connected in series with an alternating current source 26, preferably of constant potential and frequency, through an ammeter 27, the primary "auxiliary" coil 24, an adjustable resistor 28 and a fixed resistor 29. Any suitable alternating current source may be used, but I prefer to employ a synchronous motor-generator set (not shown) with the motor connected to a commercial power line, and the generator connected to the primary test coil. In this way an electric current of substantially constant voltage and frequency is obtained, line variations and surges being largely eliminated. In operation there is a potential of about 110 volts across the generator, and the current in the primary test coil varies from 8 to 10 amperes depending upon the size of the material being examined. The synchronous motor generator set naturally operates at the commercial frequency, say 60 cycles, although current of any frequency may be employed. The output of the generator should be single phase.

The flaw detector circuit

The flaw detector circuit of the apparatus depends upon the E. M. F. induced in the two pairs of flaw detection coils 13, 14 and 15, 16 which are disposed in inductive relationship with the primary test coil. The two coils of each pair of flaw detection coils are connected in series opposition with each other. Because of the arrangement described previously one coil of each pair is located closer to the inside barrel 10 and to the material to be tested than the other coil of the pair. Preferably the inner coil of each pair of flow detection coils is wound counter-clockwise and the outer coils of each coil clockwise (or vice versa) in order to facilitate the connection of the coils of each pair in series opposition. The two pairs of coils are connected in opposition to each other in a bridge circuit containing a secondary potentiometer 30 provided with a slider. As may be seen in Fig. 2, each side of the bridge contains an end of the potentiometer and one pair of flaw detection coils, while the slider of the potentiometer is connected to the common leg of the bridge. The coil arrangement just described is effective in minimizing the electro-magnetic effects induced by strain, variation in cross-section, etc., of the specimens being investigated, thus emphasizing the electromagnetic effects induced in the two pairs of coils due to the presence of flaws in the specimens.

The ends of the secondary potentiometer 30, are connected to the primary coil of an amplifier input transformer 31. The circuit between the transformer and the secondary potentiometer is shunted by a relay controlled switch 32 which is normally open, but which closes automatically when "end effect" in the test coil assembly becomes too great, thus short-circuiting the amplifier input transformer on its primary side and preventing a signal surge in the flaw detection section of the apparatus. The opening and closing of the switch 32 is described in detail in the discussion of the "Indicator control circuit" (post).

To permit the introduction of primary potential from the current source into the flaw detection circuit for compensation purposes a center tap potentiometer 33 is connected with its center tap and slider in series with the ends of the secondary potentiometer and the ends of the primary coil of the amplifier input transformer. The ends of this center tap potentiometer are connected to the both sides of the fixed resistor 29 in the primary circuit. If the flaw detector coils were each exactly alike, and each pair were disposed in exactly the same inductive relationship with the primary coil; and if stray inductive effects did not influence the flaw detection circuit, the imposition of a primary potential across this circuit would not be necessary, and the center tap potentiometer could be eliminated. In practice, however, such ideal conditions are seldom met, hence the provision of this compensation means in the instant apparatus.

Referring again to Fig. 2, it will be seen that the secondary coil of the amplifier input transformer is connected to an amplifier 34, which in turn is connected to the primary coil of an amplifier output transformer 35. In this way the relatively feeble impulses which originate in the flaw detection coils are magnified so as to be more easily observed. Any suitable type of amplifier may be employed.

The secondary coil of the amplifier output transformer has a center tap. The ends of this secondary coil are connected in series with the ends of a sensitivity control potentiometer 36. The slider of this potentiometer is connected in series to one of the ends of this potentiometer through a rectifier type microammeter 37.

The ends of the secondary of the output transformer are also connected to the plates of a diode rectifier 38 and the cathode of this diode rectifier is connected to the center tap of the secondary of the output transformer through a grid resistance condenser combination 39. This grid resistance condenser combination comprises a resistance 40 shunted by a condenser 41.

The side of the grid resistance condenser combination which is connected to the center of the secondary coil of the output transformer is also connected to an end of a potentiometer 42 and through the slider of this potentiometer to the cathode of a grid-controlled gas tube 43. The ends of potentiometer 42 are connected to a battery 44 or other direct current source. The negative side of the direct current source is connected to that end of the potentiometer 42 which is also connected directly to the grid resistance-condenser combination. The grid 45 of the grid-controlled tube is connected to the end of the grid resistance condenser combination nearest to the diode rectifier. The plate 46 of the grid-controlled tube is connected to the cathode 46A of the tube through the coil of a relay control switch 48 and through a condenser 49.

The flaw detector circuit is completed by a lead connected to the end of potentiometer 42 remote from the grid resistance condenser combination and to an end of the secondary coil of the output transformer in series with a neon light 50 through switch arm 51 and contact point 52 of the double throw relay controlled switch. The other contact point 53 of said relay controlled switch is connected into the circuit between the relay coil 48 and the condenser 49.

The operation of the flaw detector circuit may be described as follows:

A magnetic field which permeates a magnetizable body is subject to distortion by the presence of flaws in the body and by the presence of strains. However, both internal and surface strains, particularly those caused by heat treatment or by mechanical working, generally cause so-called "longitudinal" distortions of the magnetic field whereas flaws are generally manifested by "transverse" distortion in the field. In other words, if the major axis of the field coincides with the major axis of the steel bar, or other elongated magnetizable body, variations in strain are noted chiefly in a plane parallel to the longitudinal or major axis of the field, whereas flaws are manifested by field distortions observed in a plane at right angles to this axis.

In order to detect flaws in a specimen it is therefore desirable to observe "transverse" distortions in the magnetic field without interference from the "longitudinal" distortions, or in other words, to detect deviations from the normal character of the transverse cross-section of a magnetic field surrounding a magnetic specimen, at the same time eliminating or reducing manifestations caused by deviations in the normal character of a longitudinal cross-section of the field.

This result may be produced with the arrangement of flaw detector coils (13, 14, 15, 16) illustrated in Fig. 2. When an alternating current is passed through a primary coil disposed in inductive relationship with an elongated magnetizable body, and when the flaw detector coils are placed in the field thus created, a substantial electromotive force appears in a bridge circuit connected with the flaw detector coils only when there is a flaw in the body. The explanation of this phenomenon appears to be as follows:

One coil of each pair is disposed nearer to the magnetizable body than is the other coil of this pair; the coils of each pair are connected to each other in series opposition and are wound opposite to each other, and the two pairs are opposed to each other in a bridge circuit. Because of the direction of winding on the coils and their connections with each other the circuit is substantially non-inductive, and deviations from the normal longitudinal section of the magnetic field will produce practically no resultant E. M. F. in the circuit connected to coils 13, 14, 15 and 16. Therefore strain conditions in the magnetizable body are not indicated.

On the other hand, the presence of a flaw in the body produces an entirely different set of electrical and magnetic conditions. A flaw is seldom uniform, and will almost invariably set up a distortion in a plane of the field at right angles to the major axis of the field. As the body is moved through the field, the plane in which the distortion appears passes under one pair of flaw detector coils. This induces an unbalanced electrical condition between the two pairs of coils. Assuming that the plane in which the distortion occurs passes through coil pair 13, 14, the coil 13, which is nearest the magnetizable body will have an E. M. F. induced in it which is different from the E. M. F. in the other coil 14. There will therefore be a resultant E. M. F. in this coil pair which is different from the resultant E. M. F. in the other pair of coils (15, 16) which is more remote from the transverse plane in which the field distortion caused by the flaw is manifested. Consequently an E. M. F. will be imposed across the bridge circuit which connects the two pairs of coils. An indicating instrument placed in this bridge circuit will show the presence of a flaw in the body by detecting the presence of an electromotive force in the circuit.

If the flaw detection coils were physically and electrically identical and were disposed in exact concentric relationship with the primary coil, the bridge circuit would always be in balance except when a flaw was present in the inductively associated specimen. In practice, such an ideal condition is seldom encountered. Consequently, I have provided the potentiometers 30 and 33. The potentiometer 30 may be employed to vary the resistances of the two sides of the bridge circuit, and the potentiometer 33 may be employed to introduce a regulated primary electromotive force into the bridge circuit if the resistance regulation permitted by the potentiometer 30 is insufficient to balance the bridge circuit when a specimen which is known to be free from flaws is inserted in the test coil assembly.

For slow speed flaw detection any alternating current indicating device which is sufficiently sensitive may be connected across the bridge circuit, or a suitable amplifier may be connected across the bridge circuit with the alternating potential indicator connected to its output side. Thus, in slow speed testing, the amplifier 34, connected across the bridge circuit through the input transformer 31 and connected to the microammeter 37 through the amplifier output transformer 35, is adequate. The presence of a flaw in a specimen is manifested by a sufficiently prolonged deflection of the needle of the microammeter.

Cracks, seams and slivers in bar stock, and pin holes, segregations of slag and imperfectly welded sections in butt-welded tubing can be detected with the microammeter type of indicator provided with suitable amplifying means at slow test speeds, say with specimens moving through the test coil assembly at speeds ranging from 10 to 20 feet per minute. These speeds are uneconomical however, when large amounts of material must be tested. Test speeds from 100 to 200 feet per minute are to be preferred.

When the specimen moves through the test coil assembly at such high speeds, simple indicating means such as a microammeter are inadequate. Even the most sensitive types of microammeters are too sluggish to indicate the presence of a current which endures for only a short space of time, in some cases for only a hundredth of a second.

An oscillographic indicator of the galvanometer or cathode ray type is fast enough to note a momentary deviation of the type undergoing consideration, but is frequently unsatisfactory for one or more of the following reasons:

1. Because the deflections of the instrument are so sharp and short as to escape observation by any but the keenest of operators, a type not often available for ordinary commercial work;

2. Because eye strain results from attempting to observe such sharp deflections; and 3. Because the oscillographic instruments are not sufficiently rugged for commercial testing and are subject to much repair.

To prolong the duration of flaw indications in high speed test work I employ the hereinbefore described grid controlled gas tube combination in conjunction with a neon signal light. The function of this portion of my apparatus is best described with reference to Fig. 2.

As previously indicated, the two transformers 31 and 35 are employed simply to furnish a convenient means for connecting the amplifier 34 in the circuit. The current in the secondary coil in the output transformer is subject to the same fluctuations as the current in the primary coil of the input transformer, but its magnitude has been substantially amplified.

The amplified output of the transformer is imposed across the alternating current rectifier type microammeter 37 through the potentiometer 36, the function of which is to control the amount of deflection which a given impulse will cause in the microammeter. In slow speed testing the magnitude of the deflection of the microammeter may be taken as an indication of the size of any flaw that is encountered, but the chief function of the microammeter is to permit a proper adjustment of the circuit for "no-flaw" conditions, i. e., a standard specimen which is known to be flawless is placed in the test coil assembly and potentiometers 30 and 33 are adjusted until no deflection takes place at the microammeter.

Now proceeding with a consideration of the special means employed for prolonging and emphasizing the indication of a flaw in high speed testing, it will be seen that the condenser 49 will normally be charged to the limit of the voltage of the direct current source 44 with which it is connected through the potentiometer 42 and the upper pole 53 of the relay-controlled switch. The condenser remains charged as long as the grid-controlled tube remains non-conducting, i. e., as long as the grid bias of this tube is sufficiently high. But when a flaw is present in a specimen within the test coil assembly, an alternating current is induced in the secondary coil of the output transformer and imposed across the diode rectifier, resulting in a unidirectional current flowing through the grid resistor-condenser combination 39 from the cathode of the diode rectifier 38 to the center tap of the secondary of the output transformer 35. This sets up a potential difference across the grid resistor, and tends to result in a direct current flow through the cathode and the grid of the grid-controlled tube 43. Actually, this results in decreasing the grid bias, so that the condenser discharges through a grid-controlled tube. The resultant current flow from the condenser to the plate of the grid-controlled tube then energizes the coil of the relay 48 and moves the associated switch arm 51 so that the direct current from the source can pass through the neon tube, causing it to flash. The neon tube will continue to flash as long as the condenser is discharging. When the condenser is discharged, no current passes through the relay coil and the switch arm returns to its normal position, so that a charge may again be built up in the condenser 49 by the direct current source 44.

The presence of the rectifier in the circuit is made desirable by the fact that a defect may be completely manifested during a half cycle only of the alternating current. If this half cycle should be of improper sign, it would increase the grid bias instead of decreasing it; the grid-controlled tube would not fire, and the flaw in the sample would pass unnoticed. With the rectifier in the circuit any current flaw in the secondary of the output transformer must result in a decrease in the grid bias, so that flaws will be shown at all times. Of course, if a flaw is sufficiently prolonged as to affect more than a half cycle of the alternating current, it would inevitably result in decreasing the grid bias of the tube, but in high speed testing such prolonged manifestation of a flaw is not always encountered. I therefore recommend the use of the rectifier.

The potentiometer 42 is inserted between the direct current source 44 and the condenser 49 so that the grid bias of the grid-controlled tube may be varied.

The flaw detector circuit per se, though described fully herein is claimed in my co-pending application Serial No. 75,944, filed April 23, 1936.

*The artificial standard circuit*

The portion of the apparatus shown in diagrammatic form on the right side of Fig. 2 is for determining whether or not a magnetizable specimen inserted in the test coil assembly corresponds to a predetermined metallurgical standard. In general, this portion of the apparatus functions as a detector for changes in the phase or amplitude of a potential induced in the "specimen" coil 12.

A brief preliminary explanation will indicate the nature of this portion of the apparatus. In effect, alternating potentials set up in the coil 12 are opposed in the circuit by an auxiliary alternating potential corresponding in phase and amplitude to the potential which should be set up in coil 12 by a specimen having the proper metallurgical characteristics. When the two opposed potentials are equal in phase and amplitude, there is no resultant potential and no indication is given by the apparatus. If, however, the specimen in the test coil assembly does not conform to the required standard, a differential potential will be set up due to a variation in amplitude or a phase shift between the two opposed potentials. In either case the apparatus will indicate the changed condition, and advise the operator to reject the specimen.

The auxiliary potential which opposes that set up in the coil 12 is induced from the primary current source by suitable devices for regulating amplitude and phase of an alternating current potential.

The "specimen" coil 12 is connected to a phase shifter 55. The phase shifter comprises a four-sided bridge. In two opposed sides of the bridge are disposed fixed condensers 56, 57. In the other two opposed sides of the bridge are disposed two adjustable resistors 58, 59, which may be adjusted simultaneously. The two corners of the phase shift bridge intermediate the connections to the "specimen" coil 12 are connected to the input side of an amplifier 54, the output leads of which are connected to a high impedance primary coil 60 of a matching transformer 61. The amplifier is placed in the circuit to offset voltage reduction in the matching transformer which would otherwise decrease the indications of metallurgical differences to an excessive degree. Any suitable type of voltage amplifier may be employed.

The apparatus contains four mixer transformers, numbered respectively, 69, 70, 71 and 72. Each transformer is provided with two primary coils, numbered respectively, 65 and 78, 66 and 77, 80 and 67, and 81 and 68. The function of these mixer transformers will be made clear hereinafter.

Continuing with the description of the circuit, the secondary coil 62 of the matching transformer is connected in series with a switch 63, a relay controlled switch 64 and the primary coils 65, 66, 67 and 68, respectively, of the mixer transformers 69, 70, 71, 72. This series circuit is completed by a connection from primary coil 68 through the sliders and center-tap of a potentiometer 73, and the center-tap and slider of another potentiometer 62A.

Potential for the primary coils 78 and 77 of the mixing transformers 69 and 70, respectively, is supplied directly from the primary alternating current source 26 through a circuit which comprises a current limiting resistor 74, a primary coil 75 of phase shifting transformer 76, the potentiometer 62A through its ends, the coils 77 and 78 of the mixing transformers 70 and 69, and the alternating current source 26.

Potential for the primary coils 80 and 81 of the mixer transformers 71 and 72, respectively, is supplied from a secondary coil 79 of the phase shifting transformer 76 through a series circuit comprising the secondary coil 79 of the phase shifting transformer 76, the potentiometer 73, through its ends, the primary coil 80, the primary coil 81, and a tuning condenser 82. This tuning condenser is of such capacity as to cause a phase displacement of substantially 90 degrees between the currents in primary coil 75 of the phase shifting transformer and secondary coil 79 of this transformer.

Now considering the mixer transformers in detail, it will be seen that the primary coils 65, 66, 67, 68 of the mixing transformers 69, 70, 71 and 72, respectively, are connected in series addition and receive potential from the metallurgical coil 12 through the matching transformer and the phase shift bridge. Two other potentials, 90° out of phase with each other may also enter this circuit through the potentiometers 62A and 73.

The primary coils 77 and 78 of the mixing transformers 70 and 69, respectively, receive primary current from the alternating current source 26, and are connected in series opposition with each other. The primary coils 80 and 81 of the mixing transformers 71, 72, respectively, receive electrical impulses 90 degrees phase displaced from the primary potential through the secondary coil of the 90° phase shifting transformer and are connected to each other in series opposition.

Each of the mixing transformers 69, 70, 71, 72, is provided with a center-tap secondary coil numbered respectively 83, 84, 85 and 86. These secondary coils are connected to rectifier tubes 87, 88, 89 and 90, respectively, although the mode of connection is different. Thus, the mixing transformers 69 and 72 are connected to the plates of rectifier tubes 87 and 90 while the ends of the secondary coils 84 and 85 of the mixing transformers 70, 71 are connected to the cathodes of rectifier tubes 88 and 89.

The two cathodes of the rectifier tube 87 are connected to the two plates of the rectifier tube 88 through the ends of a balancing potentiometer 91. The two plates of the rectifier tube 89 are connected to the two cathodes of the rectifier tube 90 through the ends of another balancing potentiometer 92. The slider of the balancing potentiometer 91 is connected to the slider of still another potentiometer 93, and the slider of the potentiometer 92 is connected to the slider of a fourth potentiometer 94. Potentiometers 93 and 94 are known as "sensitivity control" potentiometers. The two sensitivity control potentiometers are shunted, respectively, by a pair of zero center direct current galvanometers 95 and 96. The circuit containing the two potentiometers, the two sensitivity control potentiometers, the two zero center direct current galvanometers, the four rectifier tubes and the four secondary coils of the mixing transformers is completed by leads which connect an end of each sensitivity control potentiometer with the center point of each of the secondary coils 83, 84, 85, 86 of the mixing transformers.

The mode of operation of this artificial standard circuit and the functions of its various pieces of equipment will now be described.

It is first necessary to consider the action of the four mixing transformers. Taking, for example, the pair of mixer transformers 69 and 70, it will be seen that the primary coil 65 of the transformer 69 receives a current (designated hereinafter as X) from the secondary coil of the matching transformer 61. This current is derived from electrical impulses set up in the specimen coil 12 through the matching transformer, the amplifier and the phase shifter bridge. The other primary coil 78 of the mixing transformer 69 receives a current (hereinafter designated as Y) directly from the alternating current source 26.

The currents X and Y are necessarily of the same frequency, but may be displaced from each other by a phase angle $\phi$. The two primary coils 78, and 65 are, as shown, arranged so that their direction of winding is the same; in other words, they create an electro-magnetic flux by addition. The secondary potential produced in the secondary coil 83 of this matching transformer is, therefore, proportional to the vector summation of the potentials in the primary coils 65 and 78.

Now considering the matching transformer, numbered 70, it will be seen that the same currents X and Y are also supplied to it, but inasmuch as its two primary coils 66 and 77 are wound oppositely, they create a resultant electromagnetic flux proportional to their difference. The secondary coil 84 of the matching transformer will have a potential proportional to the vector difference of the potentials in coils 66 and 77.

The secondary potentials of the mixing transformers 69 and 70 are both rectified and opposed to each other through the potentiometer 91. The galvanometer 95 thus produces a reading which is a function of the two primary potentials introduced into the two mixing transformers and also of the angular phase displacement $\phi$ between these two potentials. A more elaborate discussion of the functions of the mixing transformers is contained in my copending application Serial No. 33,854, filed July 30, 1935.

The two mixing transformers 71 and 72 with their appurtenant apparatus function in the same manner as the mixing transformers 69 and 70 as just described, except that a current $Y_1$, which is 90° out of phase with the primary current Y in the primary coils of the mixer transformers 69 and 70, is substituted. The result is that the reading of the galvanometer 96 is a function of the potential of current X, the potential of current $Y_1$ and an angle $\phi_1$ representing the phase displacement between the two potentials.

The net result of the action of the four mixing transformers and the circuits connected to their secondaries is to indicate differences of two right angled components of the potential of current X from two other right angled components represented by the potentials of currents Y and $Y_1$. A metallurgical difference related to either a magnetic or an electric variation may be manifested in either or both components of the potential of the current X.

By means of the phase shifter bridge 55 the phase of the current X derived from the secondary coil of the second matching transformer may be given any arbitrary value; and this current at any arbitrary phase may be completely compensated inasmuch as auxiliary potentials 90° phase displaced from each other may be introduced into the circuit containing the secondary coil of the second matching transformer through the potentiometers 73 and 62A. It is, therefore, possible to balance the electrical impulses in the artificial standard circuit by inter-related adjustment of the phase shifter bridge and the two potentiometers 62A and 73. Accordingly, by these adjustments and with a standard magnetizable specimen placed in inductive relationship with the specimen coil 12, the two galvanometers 95 and 96 both may be made to read zero. Thereafter, if this standard magnetizable specimen is replaced by one having different magnetic or electric characteristics, these different characteristics will be indicated at either galvanometer and warn the operator that the material is not similar to the predetermined standard and should be rejected.

The indicator control circuit

The arrangement of the apparatus as described so far is not suited for continuous operation because the removal or introduction of a specimen from the test coil assembly will cause sudden deflections of the galvanometers 95 and 96 of the artificial standard circuit and may also cause undue strain in the flaw detector circuit of the apparatus where the resultant unbalanced condition of secondary coils 13, 14, 15 and 16 will cause a continuous flashing of the neon light 50, and deflect the milliammeter 37 violently and suddenly. In continuous testing, therefore, it is necessary to provide an automatic control mechanism which will protect the indicating instruments 37, 95 and 96 and the neon light 50 whenever a magnetizable body is removed from the test coil assembly.

I have devised an efficient, sensitive and reliable control circuit, which is adapted to interrupt energization of the flaw detection and metallurgical analyses portions of the apparatus whenever the ends of a specimen approach the ends of the primary coil 4 in the test coil assembly (see Fig. 1).

As shown in Fig. 1, the "end effect" coils 19 and 20 of the indicator control circuit are disposed respectively adjacent the ends of the test coil assembly. The connection of these "end effect" coils with the indicator control circuit, as shown in Fig. 2, is a bridge having an "end effect" coil and a potentiometer numbered respectively 97 and 98 connected in series opposition in each of two outside legs. The middle or common leg of this bridge arrangement is connected to the secondary auxiliary coil 25 of the auxiliary coil assembly disposed at right angles to the main test coil assembly as hereinbefore described. The potential induced in the secondary auxiliary coil 25 therefore opposes the potentials induced in the "end effect" coils 19 and 20. The electrical characteristics of the coils are such that the potential induced in coils 19 and 20 are exactly balanced by the potential induced in coil 25 when no magnetizable body is present in the test coil assembly. When a magnetizable body is present the potential of the end effect coils is increased by the greater inductive effect.

The sliders of the two potentiometers are connected respectively to an end of a primary coil in a pair of transformers 99, 100, while the other ends of the primaries of these transformers are connected to each other and to a common point between the two potentiometers 97 and 98, thus forming a parallel circuit, each side containing a primary coil of a transformer and the slider and one end of a potentiometer.

The secondary coils of the transformers 99, 100 are connected respectively with a pair of diode triode tubes 101, 102. The connections of the diode triode tubes with their respective secondary transformer coils are the same. Thus the secondary coil of transformer 99 is connected to the cathode and the diode plates of the tube 101 through a grid leak condenser combination 103. The triode grid of the diode triode tube 101 is connected to the end of the grid leak condenser combination 103 which is connected directly to the end of the secondary of the transformer 99. Similarly, the cathode, diode plates and triode grid of the diode triode tube 102 are connected to a grid leak condenser combination 104 and to the secondary of the transformer 100.

The plates of the two diode triode tubes are connected in parallel with each other to the switch 97, which is connected in series with a relay coil which serves to open and close the relay controlled switches 32 and 64. The other end of the relay coil is connected to the positive pole of a plate supply battery 106, the negative pole of which is connected to the cathodes of both of the glow tubes in parallel with each other.

The purpose of the indicator control circuit, of course, is to close the switch 32 and open the switch 64 when there is no specimen in the test coil assembly or when as a specimen is passed through the test coil assembly either of its ends approaches either of the ends of the test coil assembly. In this way the primary coil of the input transformer in the flaw detector is short circuited so that no impulse is transmitted through the input transformer into the indicator 37 or the neon light 50. At the same time, by opening the switch 64, no impulse can pass through primary coils 65, 66, 67, 68 of the mixing transformers 69, 70, 71, 72 in the artificial standard circuit. Thus, the artificial standard circuit is opened and no impulse is transmitted to indicators 95 and 96.

When, however, a specimen is completely disposed in the test coil assembly, the switch 32 will be opened and the switch 64 will be closed so that both the flaw detection circuit and the metallurgical analysis circuit will be operative.

The opening and closing of switches 32 and 64 is accomplished as follows:

Whenever there is no magnetizable body in the test coil assembly the potential in the end effect coils 19 and 20 is neutralized by the potential in the secondary stray coil 25 at right angles thereto. Thus no impulse is impressed across either of the transformers 99, 100. This results in a zero bias for the grids of both tubes, so that current flows from the plate supply battery to the plates and cathodes of the tubes and through the relay coil 105, provided of course that the switch 97 is closed. The resulting energization of the relay coil opens the switch 64 and closes the switch 32 thus rendering both the flaw detector circuit and the artificial standard circuit inoperative.

Assume now that a specimen is inserted into the test coil assembly so that it first approaches the coil 19. The presence of magnetizable material here increases the intensity of the electromagnetic field in the neighborhood of the coil 17, so that the E. M. F. in this coil rises to a much higher value than the E. M. F. in the companion coil 20. This energizes the transformer 100 and increases the grid bias of the tube 102. However, the grid bias of the other tube is unaffected so that current still flows through the tube 101 from the plate supply battery 106 to the relay coil 105. The switch 32 is, therefore, kept closed and the switch 64 is kept open, so that the flaw detector circuit and the artificial standard circuit are still inoperative.

But as the specimen passes through the test coil assembly it approaches the other end effect coil 20. In this way the E. M. F. of both coils 19 and 20 are increased, both transformers 99 and 100 become energized and the grid bias of both tubes opposes the passage of current from the plate supply battery to the relay coil, which is thus de-energized. Switch 32 opens; switch 64 closes; and the flaw detection circuit and the metallurgical circuit become operative.

As the specimen continues on its passage through the test coil assembly, an end passes by coil 19; the E. M. F. of this coil decreases; the transformer 100 passes no impulse; the grid bias of tube 102 drops to zero; current flows again from the plate supply battery to the relay coil; and the switch 32 is closed while the switch 64 is opened. The flaw detection circuit and the artificial standard circuit are thus rendered inoperative again and the indicators in both of these circuits are protected.

As each test specimen is introduced into the test coil assembly the above-described play of forces is repeated, so that the indicating instruments for the detection of flaws and metallurgical dissimilarities are protected against violent movement due to "end effect".

The sensitivity of the indicator control circuit and hence the degree of protection afforded to the various indicators may be regulated by adjusting the sliders of the potentiometers 97 and 98.

*Operation of the entire apparatus*

When the entire apparatus is used for high speed testing the following procedure is followed.

The flaw detector circuit is adjusted as hereinbefore described, i. e., with a standard specimen known to contain no flaws, the settings of the potentiometers 30 and 33 are adjusted until no indication is shown at the microammeter 37.

The adjustment of the artificial standard circuit is made as follows: With the switch 63 opened so that no potential is supplied to the coils 65, 66, 67, 68, of the respective mixing transformers, and with current being supplied to the coils 77, 78 of two mixer transformers directly from the alternating current source and to the primary coils 80 and 81 of the other mixer transformers from the secondary coil of the phase transformer, the galvanometers 95, 96 are made to read zero by adjusting the sliders of the potentiometers 91 and 92.

Next, with the switch 97 open so that the action of interrupter circuit will not interfere with the preliminary adjustment of the device, and with a standard specimen of known and desired character inserted substantially symmetrically in the test coil assembly, the switch 63 is closed so that all of the primary coils of the mixer transformers are energized. An electromotive force has now been set up in the "specimen" coil 12 and transferred through the matching transformer and the phase shifter bridge (which is set at an arbitrary point) to the secondary coil of the second matching transformer 61. The electromotive force thus induced in the secondary or output coil of the second matching transformer is then compensated by adjusting the position of the sliders on the potentiometers 62A and 73 until the two galvanometers again attain zero positions. Bearing in mind that the currents flowing through the potentiometers 62A and 73 are 90° phase displaced from each other it will be clear that the electromotive force in the secondary of the second matching transformer has now been compensated with regard to these two components.

The artificial standard circuit is now ready to operate. If the standard specimen is replaced by a second and metallurgically dissimilar specimen in the test coil, the dissimilarity will be indicated by either or both of the galvanometers and the unsatisfactory material may be rejected by the operator. This method of operation merely indicates some magnetic or electric dissimilarity. While satisfactory in many instances, as for example when it is necessary to sort a mixed lot of bars which look alike but are metallurgically or chemically different, this method of operation does not permit the determination of a particular type of metallurgical variation. When a particular type of metallurgical variation is sought the following preliminary steps are taken:

Assuming that it is desired to determine the hardness of strip material, a good strip having all desired characteristics is first placed in the test coil assembly, and with the phase shifter bridge set arbitrarily (as described hereinbefore) the potentiometers 62A and 73 are adjusted until the galvanometers read zero. Then the good strip is replaced by one of the same kind except that it is excessively hard. This will probably cause a deflection at both galvanometers. The deflection of one of the galvanometers (say 95) is reduced to zero by adjusting the phase shifter bridge. The hard strip is then replaced by the good strip and the two galvanometers are again brought to zero position by adjusting the potentiometers 62A and 73. The procedure is repeated until the hard strip produces deflections at one galvanometer (say 96) and no deflection at the other (say 95), without requiring a shift of the potentiometers 62A and 73 to attain zero readings on the galvanometers when the hard bar is replaced by the good bar.

After the artificial standard circuit has been regulated in either of the two ways just described, the switch 97 is closed so that the interrupter circuit comes into play, and the apparatus is ready for high speed testing.

The bars may now be passed through the test coil assembly at high speed, say from 100 to 200 feet per minute. The presence of flaws will be shown infallibly by a single or repeated flashing of the neon light in the flaw detector circuit, and the occurrence of dissimilarities from a predetermined metallurgical standard will show up on the galvanometers in the artificial standard circuit.

The operator may give his entire attention to these meters and will not be misled by electrical manifestations of end effect because of the operation of the indicator control circuit. If it should appear that the indicator control circuit is operating too promptly, i. e., if it cuts out the flaw detector circuit or the artificial standard circuit before the end of a bar has passed sufficiently far through the test coil assembly, it may be adjusted by moving the setting of either or both of the potentiometers 97, 98.

Because of the high operating speed, flaws and short strain variations in magnetizable material are usually not indicated by the galvanometers in the artificial standard circuit because the indicating impulse is of too short duration to cause movement of the galvanometers. Metallurgical dissimilarities, however, are usually manifested throughout the entire length of a bar or other specimen, so that the galvanometers have sufficient time to note a deflection due to these causes.

Naturally it may not always be desired to use both the flaw detector circuit and the artificial standard circuit simultaneously. For example, if it is merely desired to sort out a mixed lot of material of different analysis it is unnecessary to employ the flaw detector. So, also, when the analysis of the material is unimportant and flaws only are sought, it is unnecessary to employ the artificial standard circuit. In any case, however, except when a relatively long continuous body is being tested it is desirable to employ the indicator control circuit to avoid the unnecessary violent and non-indicative movements of the indicators due to end effect.

I claim:

1. In a magnetic analysis apparatus the combination which comprises an exciter coil disposable in inductive relationship with a magnetizable body, a source of alternating current for energizing the exciter coil, one or more secondary coils disposed in inductive relationship with the exciter coil, means for indicating an electrical potential induced in the secondary coils, and metal rings disposed co-axially at both ends of the exciter coil to reduce the potential change in the secondary coil when a magnetizable body is removed from inductive relationship with the exciter coil.

2. In a magnetic analysis apparatus the combination which comprises an exciter coil disposable in inductive relationship with a magnetizable body, means for energizing the exciter coil with alternating current, a plurality of secondary coils connected in a bridge network with a potential indicating means and disposed in a bridge network with the exciter coil, at least one of said secondary coils being disposable nearer to the magnetizable body than the other secondary coils, and means for controlling the introduction of potential into the indicating means in response to the removal of a magnetizable body from inductive relationship with the exciter coil.

3. In a magnetic analysis apparatus the combination which comprises an exciter coil disposable in inductive relationship with a magnetizable body, means for energizing the exciter coil with alternating current, a secondary coil disposed in inductive relationship with the exciter coil and connected to a circuit containing a phase shifter and a potential indicator, means for introducing a plurality of auxiliary potentials phase displaced from each other by a constant phase angle into said circuit, and means for controlling the introduction of potential into said indicator in response to the withdrawal of a magnetizable body from inductive relationship with the exciter coil.

4. In a magnetic analysis apparatus the combination which comprises an exciter coil disposable in inductive relationship with a magnetizable body, means for energizing the exciter coil with alternating current, a plurality of secondary coils connected in a bridge network with a potential indicating means and disposed in inductive relationship with the exciter coil and with at least one of said secondary coils disposable nearer to the magnetizable body than are the other secondary coils, another secondary coil disposed in inductive relationship with the exciter coil and connected to a circuit containing a phase shifter and a potential indicator, means for introducing a plurality of auxiliary potentials phase displaced from each other by a constant phase angle into said circuit, and means for controlling the introduction of potential into both indicating means in response to the removal of a magnetizable body from inductive relationship with the exciter coil.

5. In a magnetic analysis apparatus having an alternating current exciter coil disposable in inductive relationship with a magnetizable body and a secondary coil disposed in inductive relationship with the exciter coil and operatively associated with a potential indicating means the improvement which comprises a pair of secondary end effect coils disposed respectively adjacent the ends of the exciter coil, a secondary auxiliary coil adapted to induce a potential opposing that induced in the pair of secondary end effect coils when no magnetizable body is disposed in inductive relationship with the exciter coil, a bridge network connected to the end effect coils and the neutralizing coil, and means operatively associated with the bridge network for controlling the introduction of potential in the indicating means in response to an increase in potential in the pair of secondary end effect coils.

6. Apparatus in accordance with claim 5 in which the means for interrupting the introduction of potential into the indicating means comprises a relay operated switch, a direct current source, and means for interrupting the passage of current from the direct current source into the relay except when the potential in the two end effect coils is approximately equal.

7. In a magnetic analysis apparatus, the combination which comprises an exciter coil disposable in inductive relationship with a magnetizable body, a source of alternating current for energizing the exciter coil, one or more secondary coils disposed in inductive relationship with the exciter coil, means for indicating an electrical potential induced in the secondary coil, electrical means for controlling the indication of the induced potential in the indicating means in response to the removal of a magnetizable body from inductive relationship with the exciter coil, and metal rings disposed co-axially at both ends of the exciter coil to reduce the potential change in the secondary coil when the inductive relationship of a magnetizable body with respect to the exciter coil is changed.

THEODOR ZUSCHLAG.